United States Patent
Aoki et al.

(10) Patent No.: US 11,438,517 B2
(45) Date of Patent: Sep. 6, 2022

(54) RECOGNITION DEVICE, A RECOGNITION METHOD, AND A PROGRAM THAT EASILY AND ACCURATELY RECOGNIZE A SUBJECT INCLUDED IN A CAPTURED IMAGE

(71) Applicant: Sony Corporation, Tokyo (JP)

(72) Inventors: Suguru Aoki, Tokyo (JP); Ryuta Satoh, Kanagawa (JP); Keitaro Yamamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 116 days.

(21) Appl. No.: 16/966,041

(22) PCT Filed: Nov. 16, 2018

(86) PCT No.: PCT/JP2018/042447
§ 371 (c)(1),
(2) Date: Jul. 30, 2020

(87) PCT Pub. No.: WO2019/155718
PCT Pub. Date: Aug. 15, 2019

(65) Prior Publication Data
US 2020/0366825 A1    Nov. 19, 2020

(30) Foreign Application Priority Data
Feb. 9, 2018 (JP) .............................. JP2018-021493

(51) Int. Cl.
*H04N 5/235* (2006.01)
*G06V 10/30* (2022.01)
(Continued)

(52) U.S. Cl.
CPC .......... *H04N 5/2352* (2013.01); *G06V 10/30* (2022.01); *G06V 10/50* (2022.01); *G06V 40/10* (2022.01); *H04N 5/2351* (2013.01)

(58) Field of Classification Search
CPC .............. H04N 5/2352; H04N 5/2351; H04N 5/23245; G06V 10/30; G06V 10/50;
(Continued)

(56) References Cited

U.S. PATENT DOCUMENTS 9,064,418 B2 * 6/2015 Takemura .............. G08G 1/166
2015/0242695 A1  8/2015 Fan
(Continued)

FOREIGN PATENT DOCUMENTS

JP    H09282452 A    10/1997
JP    2015-014819 A    1/2015
(Continued)

OTHER PUBLICATIONS

International Search Report and Written Opinion dated Feb. 19, 2019 for PCT/JP2018/042447 filed on Nov. 16, 2018, 9 pages including English Translation of the International Search Report.

Primary Examiner — Luong T Nguyen
(74) Attorney, Agent, or Firm — Xsensus LLP

(57) ABSTRACT

A recognition control circuitry detects a light amount of an imaging area on the basis of an image signal from a camera, a control signal from a camera control circuitry, and the like, and generates selection determination information on the basis of a detection result of the light amount. A recognition processing circuitry performs area division on an image of an imaging area generated by the camera on the basis of the selection determination information generated by the recognition control circuitry, and selects a recognizer for each area. Moreover, the recognition processing circuitry performs a subject recognition process on an image of the corresponding area by using the selected recognizer. Even when a captured image includes a bright area and a dark area, a subject in each area can be easily and accurately recognized.

13 Claims, 12 Drawing Sheets

(51) Int. Cl.
*G06V 10/50* (2022.01)
*G06V 40/10* (2022.01)

(58) Field of Classification Search
CPC ...... G06V 40/10; G06V 10/143; G06V 20/56; G06V 9/6227; G06T 7/00; G06T 5/002
See application file for complete search history.

(56) References Cited

U.S. PATENT DOCUMENTS

| | | | |
|---|---|---|---|
| 2016/0048734 A1* | 2/2016 | Lee | G06V 20/584 348/148 |
| 2016/0098606 A1* | 4/2016 | Nakamura | G06V 20/584 382/103 |
| 2017/0006226 A1* | 1/2017 | Chino | H04N 5/2256 |
| 2018/0060675 A1* | 3/2018 | Ji | H04N 5/2355 |

FOREIGN PATENT DOCUMENTS

| | | |
|---|---|---|
| JP | 2015-035704 A | 2/2015 |
| JP | 2017-027220 A | 2/2017 |

* cited by examiner

RECOGNITION DEVICE, A RECOGNITION METHOD, AND A PROGRAM THAT EASILY AND ACCURATELY RECOGNIZE A SUBJECT INCLUDED IN A CAPTURED IMAGE

CROSS-REFERENCE TO RELATED APPLICATIONS

The present application is based on PCT filing PCT/JP2018/042447, filed Nov. 16, 2018, which claims priority to JP 2018-021493, filed Feb. 9, 2018, the entire contents of each are incorporated herein by reference.

TECHNICAL FIELD

The present technology relates to a recognition device, a recognition method, and a program, and enables a subject included in a captured image to be accurately recognized.

BACKGROUND ART

Conventionally, in order to accurately detect a subject at night, an exposure amount at a time of imaging is automatically switched. For example, in Patent Document 1, a photographing mode is switched between a first photographing mode capable of photographing a profile portion of lit lights, and a second photographing mode capable of detecting objects not having lights.

CITATION LIST

Patent Document

Patent Document 1: Japanese Patent Application Laid-Open No. 2009-234344

SUMMARY OF THE INVENTION

Problems to be Solved by the Invention

Meanwhile, in a case of recognizing a subject included in a captured image by using a recognizer, for example, a captured image having much noise may deteriorate recognition accuracy. Furthermore, in order to acquire a captured image with little noise, when an exposure time is lengthened and a light amount is increased, an image of a subject that has moved becomes blurred, and when an aperture is widened to increase a light amount, a depth of field becomes shallow, and a captured image with little blur cannot be acquired.

Accordingly, it is an object of the present technology to provide a recognition device, a recognition method, and a program that can easily and accurately recognize a subject included in a captured image.

Solutions to Problems

A first aspect of the present technology is
a recognition device including:
a recognition control unit configured to generate selection determination information on the basis of a light amount detection result of an imaging area; and
a recognition processing unit configured to perform a subject recognition process on a captured image showing the imaging area, by using a recognizer selected on the basis of the selection determination information generated by the recognition control unit.

In the present technology, selection determination information is generated on the basis of a light amount detection result of an imaging area. The light amount in the imaging area is detected on the basis of a control signal for control of an operation of an imaging unit that acquires a captured image and an image signal generated by the imaging unit. The control signal is a signal for control of at least any of an aperture, a shutter speed, analog gain adjustment, or gradation conversion. For example, the detection is performed on the basis of a control signal for the aperture, the shutter speed, the analog gain adjustment, and the gradation conversion, and an image signal subjected to the analog gain adjustment and the gradation conversion. Furthermore, the detection may be performed on the basis of, for example, a control signal for the aperture, the shutter speed, and the analog gain, and an image signal subjected to the analog gain adjustment. Furthermore, the detection may be performed on the basis of a control signal for the aperture and the shutter speed, and an image signal before the analog gain adjustment is performed. Moreover, the light amount may be detected on the basis of an image signal generated by the imaging unit and illuminance detected by an illuminance detection unit that detects imaging environment illuminance.

The recognition control unit performs noise estimation on the basis of a light amount detection result, and uses a noise estimation result as the selection determination information. The recognition processing unit selects a recognizer on the basis of the selection determination information. For example, the recognition processing unit selects a first recognizer in a case where noise indicated by the selection determination information is equal to or less than a threshold value, and selects a second recognizer that is more resistant to noise than the first recognizer, in a case where noise indicated by the selection determination information is larger than a threshold value. Note that the recognition processing unit performs area division of a captured image on the basis of the selection determination information, and selects the recognizer for each divided area. Furthermore, the recognition control unit may perform the area division of the captured image on the basis of conversion function information of gradation conversion indicated by a control signal for control of an operation of the imaging unit that acquires the captured image, and may generate the selection determination information for each divided area.

A second aspect of the present technology is
a recognition method including:
generating, by a recognition control unit, selection determination information on the basis of a light amount detection result of an imaging area; and
performing, by a recognition processing unit, a subject recognition process on a captured image showing the imaging area, by using a recognizer selected on the basis of the selection determination information generated by the recognition control unit.

A third aspect of the present technology is
a program for causing a computer to execute a recognition process, the program causing the computer to execute:
a procedure for generating selection determination information on the basis of a light amount detection result of an imaging area; and
a procedure for performing a subject recognition process on a captured image showing the imaging area, by using a recognizer selected on the basis of the selection determination information.

Note that the program of the present technology is a program that can be provided, for example, for a general-purpose computer that can execute various program codes, by a storage medium provided in a computer-readable format or a communication medium, such as, for example, a storage medium such as an optical disk, a magnetic disk, a semiconductor memory, or a communication medium such as a network. By providing such a program in a computer-readable format, processing corresponding to the program is realized on the computer.

Effects of the Invention

According to the present technology, selection determination information is generated on the basis of a light amount detection result of an imaging area, and a subject recognition process is performed on a captured image showing the imaging area with use of a recognizer selected on the basis of the selection determination information. Therefore, a subject included in the captured image can be easily and accurately recognized. Note that the effects described in this specification are merely examples and are not limited, and additional effects may be present.

MODE FOR CARRYING OUT THE INVENTION

Hereinafter, embodiments for implementing the present technology will be described. Note that the description will be given in the following order.

Figure 1:
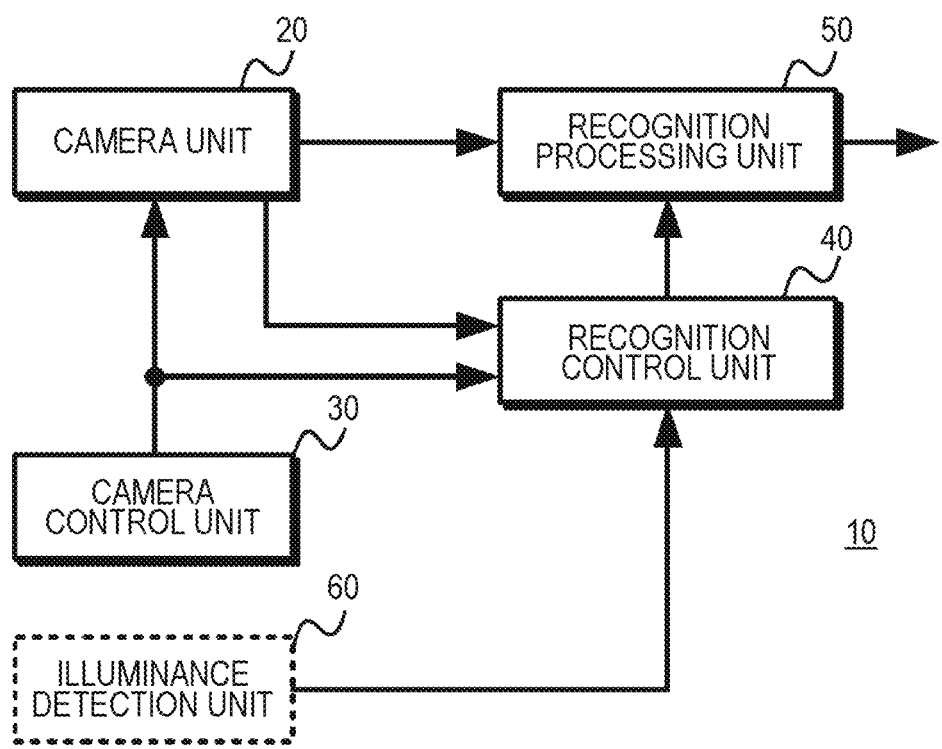
FIG. 1 is a diagram illustrating a configuration of a recognition device.

1. Configuration of recognition device
2. First Embodiment
3. Second Embodiment
4. Third Embodiment
5. Fourth Embodiment
6. Application example 1. Configuration of Recognition Device FIG. 1 illustrates a configuration of a recognition device. A recognition device 10 includes a camera unit 20, a camera control unit 30, a recognition control unit 40, and a recognition processing unit 50. Note that the camera unit 20 and the camera control unit 30 may be provided separately from the recognition device 10.

The camera unit 20 generates an image signal of a captured image showing a desired imaging area, and outputs to the recognition processing unit 50. The camera control unit 30 outputs a control signal to the camera unit 20, and controls a shutter speed, an aperture, analog gain, gradation conversion, and the like of the camera unit 20. Furthermore, the camera control unit 30 outputs a control signal to the recognition control unit 40.

The recognition control unit 40 detects a light amount in the imaging area on the basis of a control signal from the camera control unit 30 and an image signal generated by the camera unit 20. Furthermore, the recognition device 10 may be provided with an illuminance detection unit 60, and the recognition control unit 40 may detect a light amount in the imaging area on the basis of an illuminance detection signal from the illuminance detection unit 60. The recognition control unit 40 generates selection determination information on the basis of the detected light amount, and outputs to the recognition processing unit 50. For example, the recognition control unit 40 performs noise estimation on the basis of a light amount detection result, and uses a noise estimation result as the selection determination information.

The recognition processing unit 50 performs a subject recognition process on a captured image acquired by the camera unit 20, by using the recognizer selected on the basis of the selection determination information.

2. First Embodiment

Figure 2:
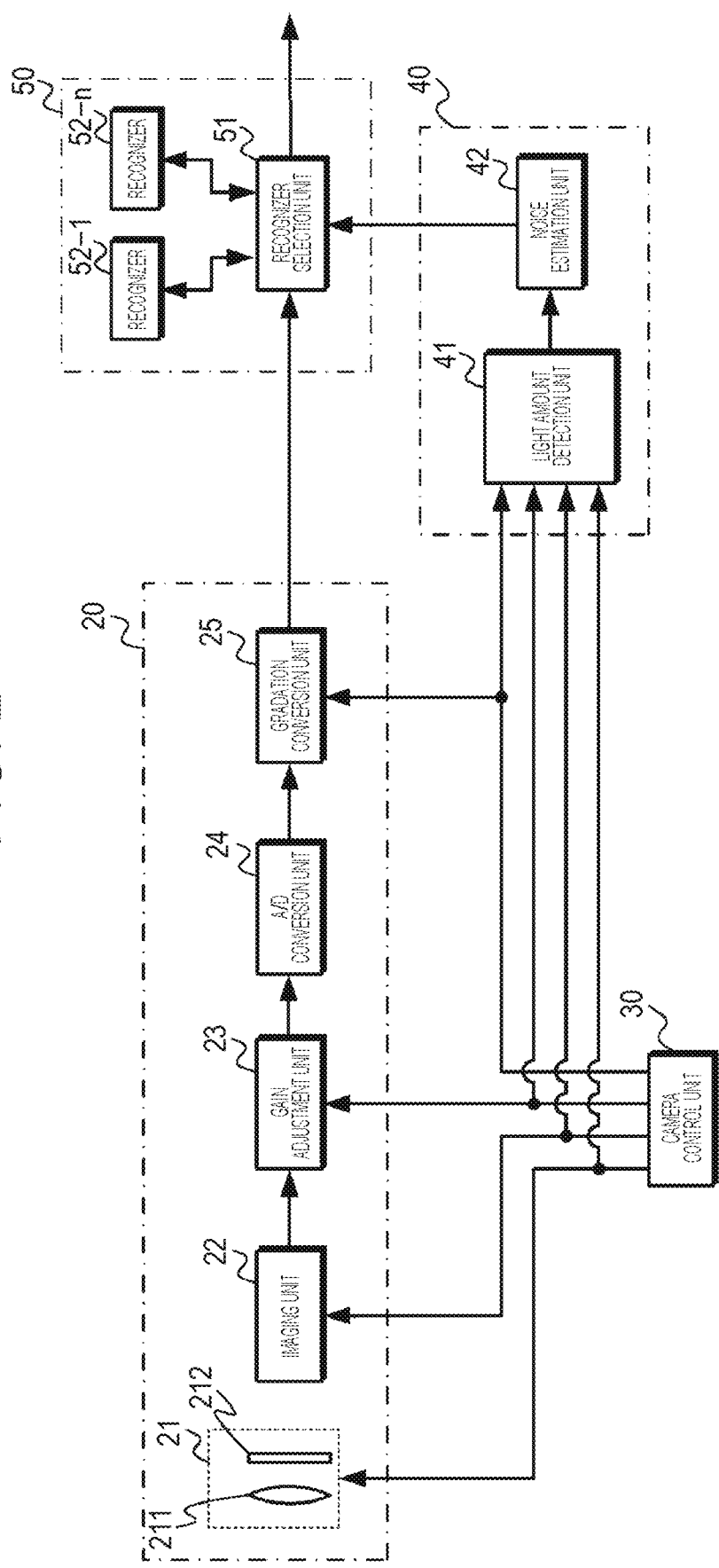
FIG. 2 is a diagram illustrating a configuration of a first embodiment.

Next, a first embodiment of the recognition device will be described. FIG. 2 illustrates a configuration of the first embodiment of the recognition device.

The camera unit 20 includes an optical system block 21, an imaging unit 22, a gain adjustment unit 23, an analog/digital (A/D) conversion unit 24, and a gradation conversion unit 25.

The optical system block 21 has an optical lens 211 and an aperture mechanism 212. The optical lens 211 causes a subject optical image to be formed as an image on an imaging surface of the imaging element of the imaging unit 22. Furthermore, the aperture mechanism 212 adjusts a light amount of the subject optical image formed as an image on the imaging surface. The optical system block 21 performs a focus operation and a zoom operation, by moving the optical lens 211 on the basis of a control signal supplied from the camera control unit 30. Furthermore, the optical system block 21 drives the aperture mechanism 212 on the basis of a control signal, to adjust the light amount of the subject optical image.

The imaging unit 22 is configured with use of an imaging element such as a complementary metal oxide semiconductor (CMOS) or a charge coupled device (CCD). The imaging unit 22 performs photoelectric conversion to generate an image signal corresponding to a subject optical image, and outputs to the gain adjustment unit 23. Furthermore, the imaging unit 22 controls an exposure period of the imaging element on the basis of a control signal supplied from the camera control unit 30, and performs imaging at a desired shutter speed. Note that the exposure period in the imaging operation may be able to be changed by providing a shutter mechanism in the optical system block 21 and driving the shutter mechanism on the basis of a control signal from the camera control unit 30.

The gain adjustment unit 23 performs gain adjustment (also referred to as analog gain adjustment) on an analog image signal generated by the imaging unit 22, and outputs to the A/D conversion unit 24. The A/D conversion unit 24 converts the image signal after the analog gain adjustment from an analog signal to a digital signal, and outputs to the gradation conversion unit 25.

The gradation conversion unit 25 compresses luminance gradation of the image signal supplied from the A/D conversion unit 24, by using a conversion function based on the control signal. The gradation conversion unit 25 outputs the image signal after the gradation conversion to the recognition control unit 40 and the recognition processing unit 50.

The camera control unit 30 generates and supplies a control signal to the camera unit 20, to control an operation of each unit in the camera unit 20. Furthermore, the camera control unit 30 outputs a control signal to the recognition control unit 40.

The recognition control unit 40 has a light amount detection unit 41 and a noise estimation unit 42. The light amount detection unit 41 detects a light amount in an imaging area, on the basis of an image signal supplied from the camera unit 20 and a control signal supplied from the camera control unit 30. The noise estimation unit 42 estimates noise on the basis of a light amount detection result of the light amount detection unit 41, and generates noise information indicating an estimation result. The noise estimation unit 42 outputs the generated noise information to the recognition processing unit 50 as selection determination information.

The recognition processing unit 50 includes a recognizer selection unit 51 and a plurality of recognizers 52-1 to 52-$n$. For example, the recognition processing unit 50 includes: a recognizer capable of recognizing a subject with high accuracy from a captured image with little noise by performing machine learning and the like using a learning image with little noise, and a recognizer capable of recognizing a subject with high accuracy from a captured image with much noise by performing machine learning and the like using a learning image with little much noise. The recognizer selection unit 51 performs an area sectioning process of an imaging area on the basis of the selection determination information from the recognition control unit 40, selects a recognizer for each sectioned area, and uses the selected recognizer 52-1 (52-$n$) to perform subject recognition on the basis of the image signal supplied from the camera unit 20.

Figure 3:
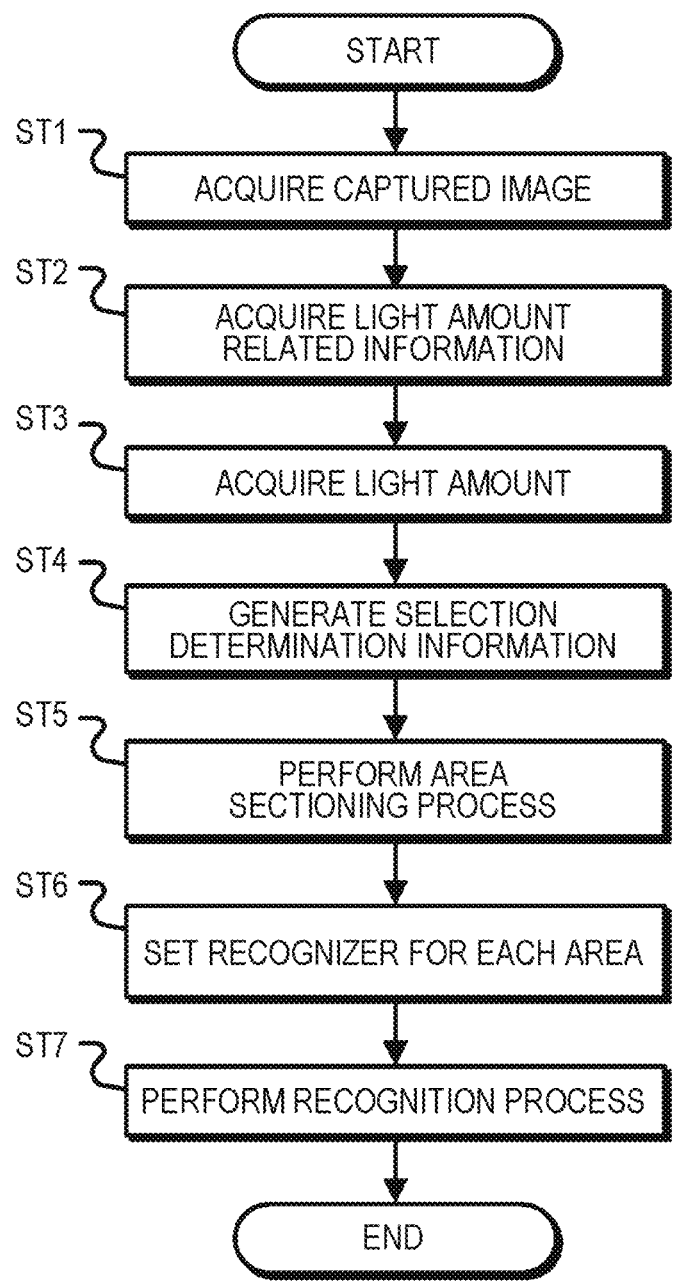
FIG. 3 is a flowchart showing an operation of the first embodiment.

Next, an operation of the first embodiment of the recognition device will be described. FIG. 3 is a flowchart showing an operation of the first embodiment. In step ST1, the recognition device acquires a captured image. The camera unit 20 performs the analog gain adjustment of an image signal generated by the imaging element, A/D conversion of the image signal after the analog gain adjustment from an analog signal to a digital signal, the gradation conversion of the image signal after the A/D conversion, and the like, to generate an image signal. The recognition processing unit 50 of the recognition device 10 acquires the image signal of the captured image generated by the camera unit 20, and the process proceeds to step ST2.

In step ST2, the recognition device acquires light amount related information. The light amount related information is information regarding a parameter that causes a change corresponding to a light amount of the imaging area. For example, an aperture value, a shutter speed, an analog gain adjustment value, a conversion function f(u,v,I(u,v)) for gradation conversion are parameters to be adjusted in accordance with a light amount of the imaging area, and control signals related to these parameters can be used as the light amount related information. Note that, in the conversion function f(u,v,I(u,v)), the parameter u,v indicates a position in the captured image, and the parameter I(u,v) indicates luminance at the position (u,v). An image signal generated by the camera unit 20 can be used as the light amount related information because a signal level changes in accordance with a light amount. Therefore, the recognition control unit 40 of the recognition device 10 acquires, as the light amount related information, a control signal outputted from the camera control unit 30 and an image signal generated by the camera unit 20, and the process proceeds to step ST3.

In step ST3, the recognition device detects a light amount. The recognition control unit 40 detects a light amount in the imaging area on the basis of the light amount related information outputted in step ST2.

Here, a light amount detection process will be described. On the basis of a light amount L(u,v) of a subject at the position (u,v) in the captured image, aperture information F regarding an aperture state, shutter speed information S regarding an exposure time, and gain information G regarding the analog gain adjustment, a signal value I(u,v) of the image signal before the gradation conversion (after the A/D conversion) at the position (u,v) in the captured image satisfies a relationship of Equation (1).

$$I(u,v)=L(u,v)*S*F*G \qquad (1)$$

Furthermore, by inputting the signal value I(u,v) of the image signal before the gradation conversion at the position (u,v) in the captured image into a conversion function of the gradation conversion, as shown in Equation (2), a signal value J(u,v) of the image signal at the position (u,v) after the gradation conversion is obtained.

$$J(u,v)=f(u,v,I(u,v)) \qquad (2)$$

Therefore, a light amount L'(u,v) calculated on the basis of Equation (3) is to indicate a light amount of the subject at the position (u,v).

$$L'(u,v)=f^{-1}(u,v,J(u,v))/(S*F*G) \qquad (3)$$

In this way, the recognition control unit 40 detects a light amount in the imaging area, and the process proceeds to step ST4.

Figure 4:
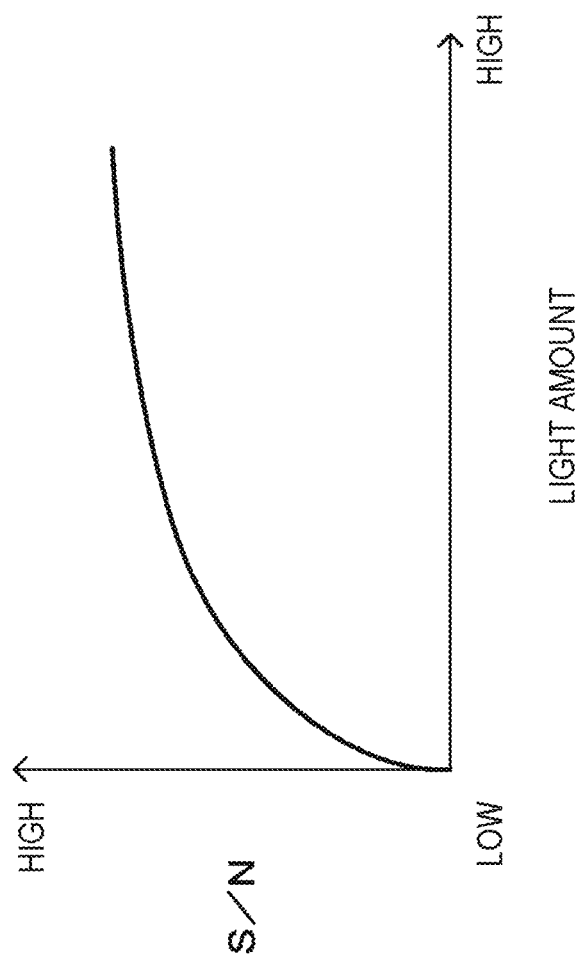
FIG. 4 is a graph illustrating a relationship between a light amount and an S/N ratio.

In step ST4, the recognition device generates selection determination information on the basis of a detection result of the light amount. The recognition control unit 40 of the recognition device 10 stores in advance, for example, characteristic information indicating a relationship between a light amount and an S/N, and noise in the light amount detected on the basis of the light amount related information is estimated. FIG. 4 illustrates a relationship between a light amount and an S/N ratio indicated by the characteristic information. The recognition control unit 40 sets, as the selection determination information, an S/N ratio corresponding to the light amount detected on the basis of noise information, that is, the light amount related information, and the process proceeds to step ST5.

Figure 5:
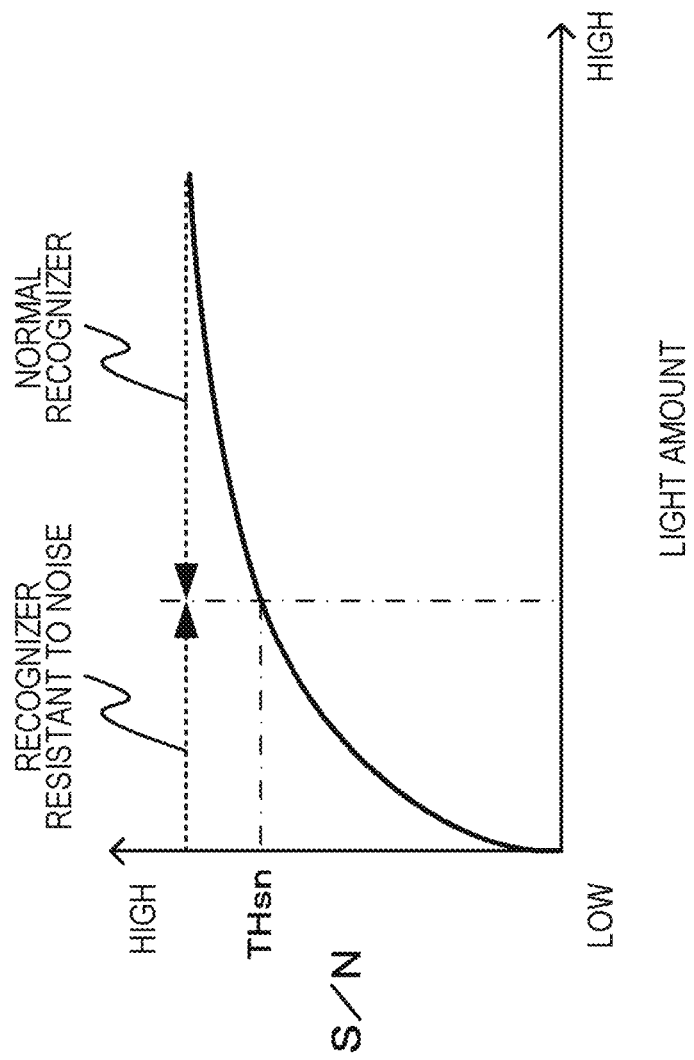
FIG. 5 is a graph for explaining area sectioning.

In step ST5, the recognition device performs an area sectioning process. The recognition processing unit 50 of the recognition device 10 sections the imaging area into, for example, an area with much noise and an area with little noise, on the basis of the selection determination information generated in step ST4. FIG. 5 is a graph for explaining area sectioning. The recognition processing unit 50 compares the selection determination information (S/N ratio) with a threshold value THsn, and sections as an area with much noise in a case where the selection determination information (S/N ratio) is equal to or less than the threshold value THsn, and sections as an area with little noise in a case where the selection determination information (S/N ratio) is larger than the threshold value THsn, and the process proceeds to step ST6.

In step ST6, the recognition device selects a recognizer for each area. The recognition processing unit 50 of the recognition device 10 selects a recognizer to be used in a recognition process for each of the areas sectioned in step ST5. The recognition processing unit 50 selects a recognizer capable of recognizing a subject with high accuracy from a captured image with little noise in an area with little noise, and selects a recognizer capable of recognizing a subject with high accuracy from a captured image with much noise in an area with much noise, and the process proceeds to step ST7.

In step ST7, the recognition device performs the recognition process. The recognition processing unit 50 of the recognition device 10 performs subject recognition for each area by using the recognizer selected in step ST6, and the process ends.

Figure 6:
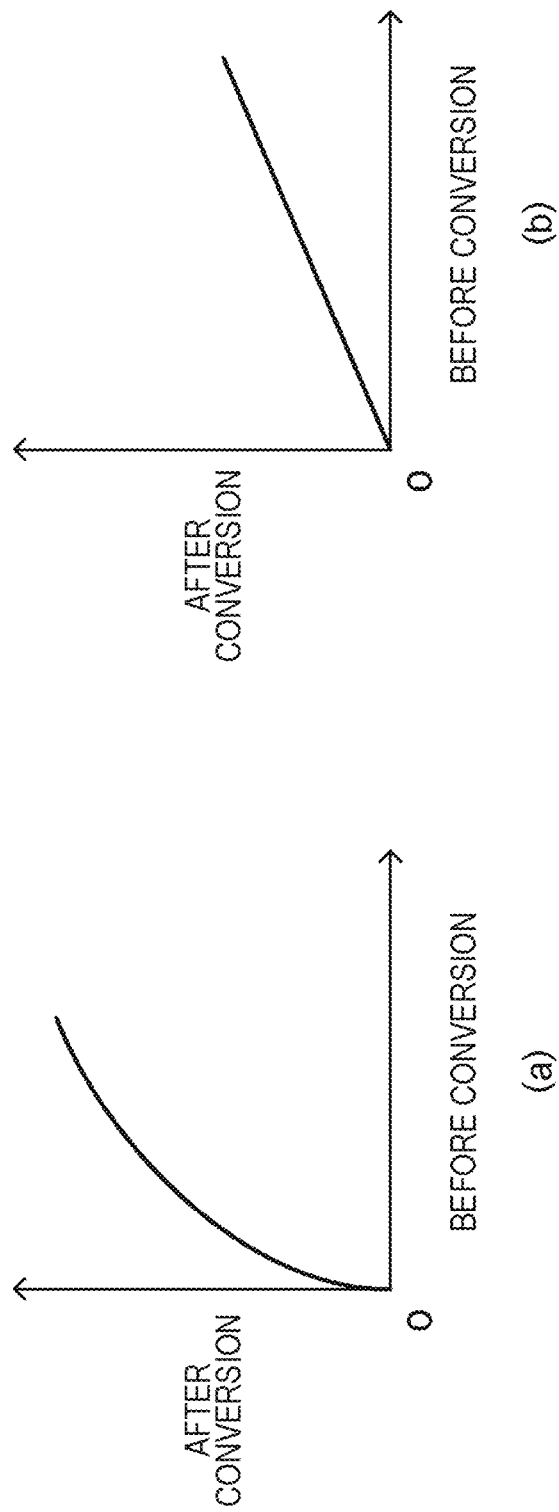
FIG. 6 is a graph illustrating a conversion function of gradation conversion.

Furthermore, in a case where the light amount related information acquired in step ST2 includes information regarding the area sectioning, detection of a light amount and estimation of noise may be performed for each area in step ST3 and step ST4. For example, there is a case where the gradation conversion function is switched for each area since overexposure or underexposure will occur when the gradation conversion is uniformly performed on the entire screen. FIG. 6 is a graph illustrating a conversion function of the gradation conversion. (a) of FIG. 6 shows a gradation conversion characteristic used in a case where underexposure occurs, and the gradation conversion is performed so as to increase a signal level change in a case where a signal level before conversion is small. Furthermore, (b) of FIG. 6 illustrates a gradation conversion characteristic used in a case where no overexposure or underexposure occurs. In this way, in a case where the conversion function is switched in the gradation conversion, the recognition control unit 40 may perform area division of the imaging area in accordance with a gradation conversion switching operation of the imaging unit that acquires the captured image, and may generate the selection determination information for each divided area.

Figure 7:
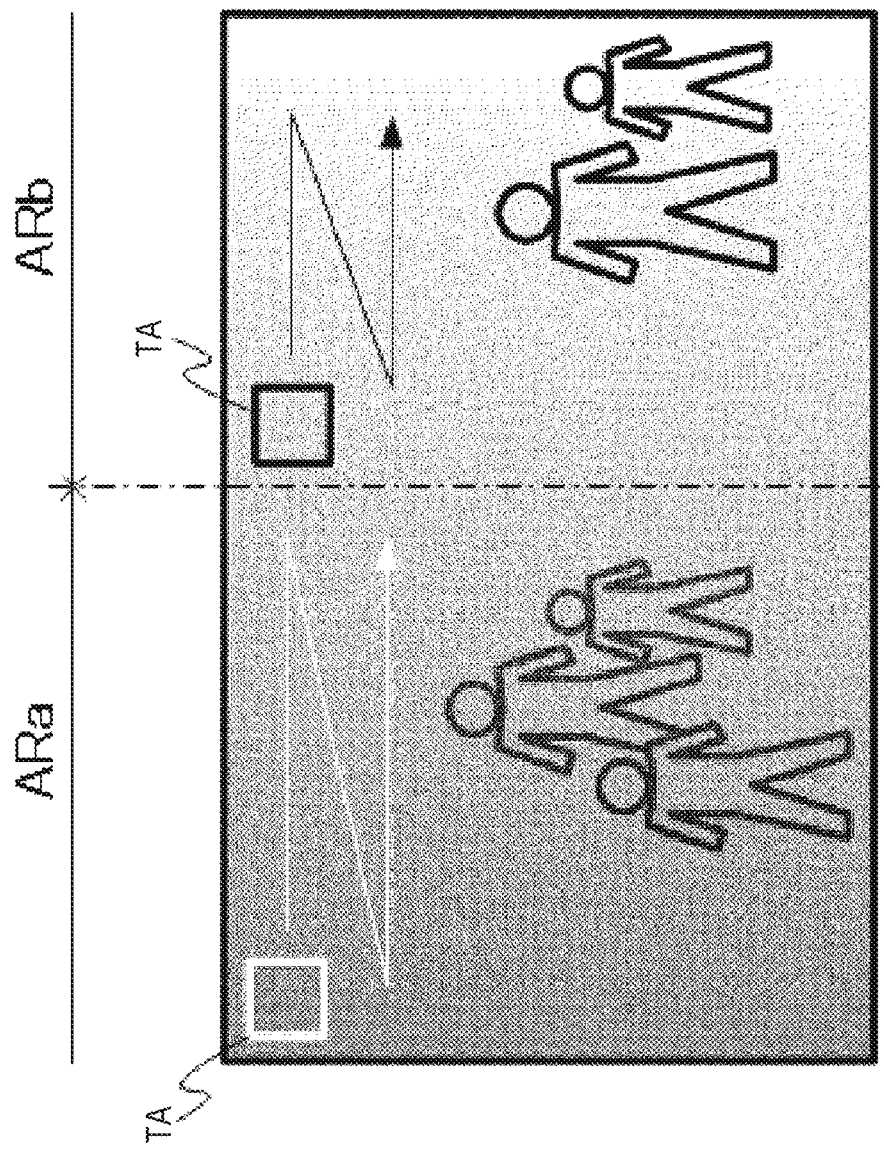
FIG. 7 is a view showing an operation example of the first embodiment.

FIG. 7 shows an operation example of the first embodiment. The recognition control unit 40 detects a light amount of the imaging area on the basis of the light amount related information, and generates selection determination information on the basis of the light amount detection result. Here, in a case where the selection determination information indicates that an area ARa is an area with much noise and an area ARb is an area with little noise, the recognition processing unit 50 selects a recognizer capable of recognizing a subject with high accuracy from a captured image with much noise in the area ARa. Furthermore, the recognition processing unit 50 selects a recognizer capable of recognizing a subject with high accuracy from a captured image with little noise in the area ARb. Moreover, the recognition processing unit 50 uses the selected recognizer to perform the subject recognition. Therefore, in a case where the subject recognition is performed by sequentially moving a recognition frame TA showing a recognition area in an arrow direction, for example, it becomes possible to easily and accurately recognize the subject in the area ARa where the light amount is small and the subject in the area ARb where the light amount is large.

In this way, according to the first embodiment, a light amount of the imaging area is detected on the basis of the light amount related information, the recognizer is selected on the basis of the selection determination information generated on the basis of the detected light amount, and a subject recognition process is performed on the captured image of the imaging area. For example, in an area with much noise in the captured image, the subject recognition is performed with use of a recognizer capable of recognizing a subject with high accuracy from a captured image with much noise. Furthermore, in an area with little noise in the captured image, the subject recognition is performed with use of a recognizer capable of recognizing a subject with high accuracy from a captured image with little noise. That is, it is possible to automatically select an optimal recognizer to perform the recognition process, without performing a process of increasing a light amount by increasing an exposure time or widening the aperture in order to acquire a captured image with little noise. Furthermore, since it is not necessary to store an image signal in a memory to perform a noise estimation process in order to estimate noise, a required memory capacity and processing amount do not increase. Therefore, a subject included in the captured image can be easily and accurately recognized.

3. Second Embodiment

Next, a second embodiment will be described. In the second embodiment, a control signal at a stage prior to gradation conversion and an image signal before the gradation conversion is performed are used as light amount related information, to detect a light amount without being affected by the gradation conversion.

Figure 8:
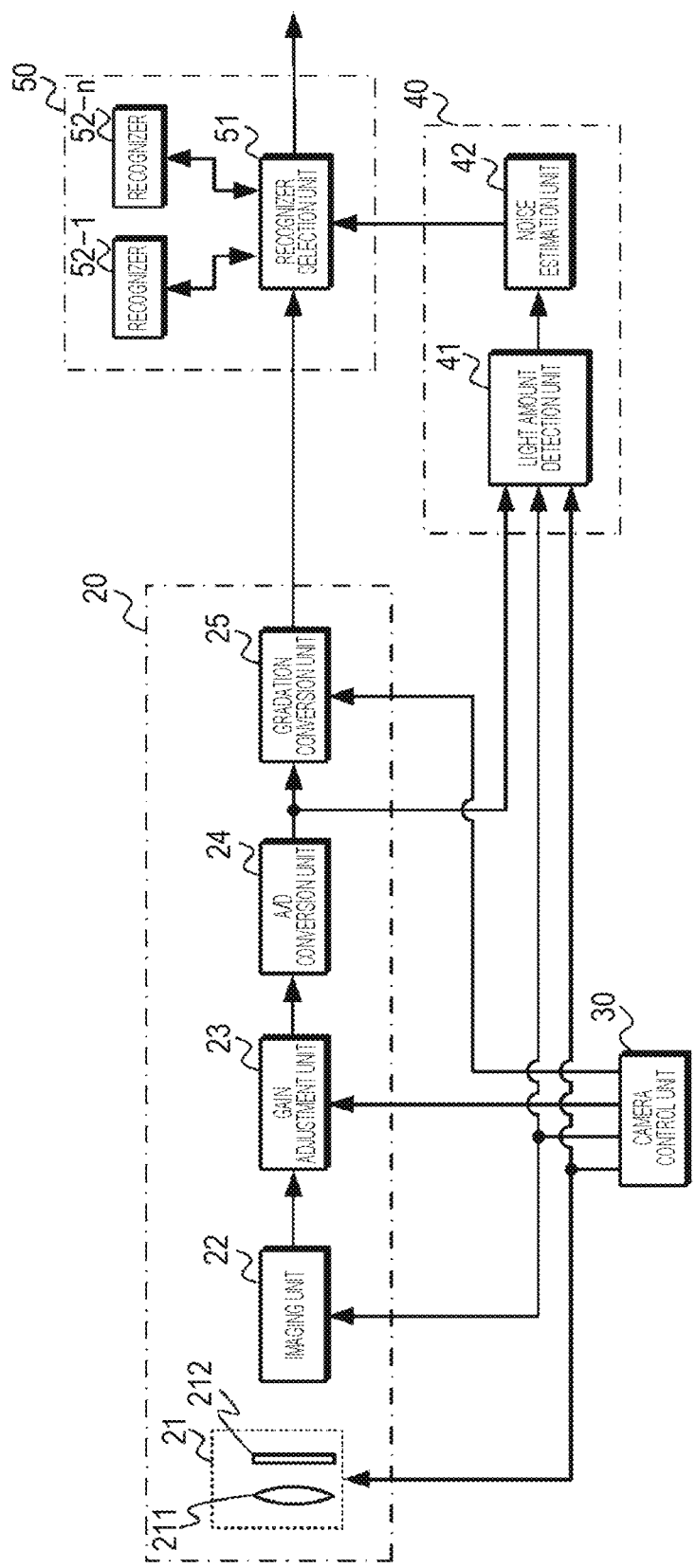
FIG. 8 is a diagram illustrating a configuration of a second embodiment.

FIG. 8 illustrates a configuration of the second embodiment of a recognition device. A camera unit 20 includes an optical system block 21, an imaging unit 22, a gain adjustment unit 23, an analog/digital (A/D) conversion unit 24, and a gradation conversion unit 25.

The optical system block 21 has an optical lens 211 and an aperture mechanism 212. The optical system block 21 performs a focus operation and a zoom operation, by moving the optical lens 211 on the basis of a control signal supplied from a camera control unit 30. Furthermore, the optical system block 21 drives the aperture mechanism 212 on the basis of a control signal, to adjust a light amount of a subject optical image.

The imaging unit 22 generates an image signal corresponding to the subject optical image, and outputs to the gain adjustment unit 23. Furthermore, the imaging unit 22 controls an exposure period of an imaging element on the basis of a control signal supplied from the camera control unit 30, and performs imaging at a desired shutter speed. Note that the exposure period in the imaging operation may able to be changed by driving a shutter mechanism provided in the optical system block 21.

The gain adjustment unit 23 performs analog gain adjustment of the image signal generated by the imaging unit 22, and outputs to the A/D conversion unit 24. The A/D conversion unit 24 converts the image signal after the analog gain adjustment from an analog signal to a digital signal, and outputs to the gradation conversion unit 25 and a recognition control unit 40.

The gradation conversion unit 25 compresses luminance gradation of the image signal supplied from the A/D conversion unit 24, by using a conversion function based on the control signal. The gradation conversion unit 25 outputs the image signal after the gradation conversion to a recognition processing unit 50.

The camera control unit 30 generates and supplies a control signal to the camera unit 20, to control an operation of each unit in the camera unit 20. Furthermore, the camera control unit 30 outputs a control signal to the recognition control unit 40.

The recognition control unit 40 has a light amount detection unit 41 and a noise estimation unit 42. The light amount detection unit 41 detects a light amount in the imaging area on the basis of the image signal before the gradation conversion supplied from the camera unit 20 and the control signal that is related to a process in a stage prior to the gradation conversion and is supplied from the camera control unit 30.

The noise estimation unit 42 estimates noise on the basis of a light amount detection result of the light amount detection unit 41, and generates noise information indicating an estimation result. The noise estimation unit 42 outputs the generated noise information to the recognition processing unit 50 as selection determination information.

The recognition processing unit 50 includes a recognizer selection unit 51 and a plurality of recognizers 52-1 to 52-n. For example, the recognition processing unit 50 has a recognizer capable of recognizing a subject with high accuracy from a captured image with little noise, and a recognizer capable of recognizing a subject with high accuracy from a captured image with much noise. The recognizer selection unit 51 performs an area sectioning process of an imaging area on the basis of the selection determination information from the recognition control unit 40, selects a recognizer for each sectioned area, and uses the selected recognizer 52-1 (52-n) to perform subject recognition on the basis of the image signal supplied from the camera unit 20.

In an operation of the second embodiment of the recognition device, similar processing to the operation of the first embodiment shown in FIG. 3 is performed, and processing contents of steps ST2 and ST3 are different from those of the first embodiment.

In step ST2, the recognition device acquires light amount related information. As the light amount related information, for example, aperture value information F, shutter speed information S, and gain information G are used. Furthermore, as the light amount related information, there is used an image signal before gradation conversion in which a signal level changes in accordance with a light amount of the imaging area and in which information is not degraded by the gradation conversion. The recognition control unit 40 of the recognition device 10 acquires the light amount related information in this way, and the process proceeds to step ST3.

In step ST3, the recognition device detects a light amount. The recognition control unit 40 detects a light amount in the imaging area on the basis of the light amount related information outputted in step ST2.

Here, a light amount detection process will be described. Assuming that a subject at a position (u,v) in a captured image is a light amount $L(u,v)$, and an image signal before the gradation conversion at the position (u,v) is a signal value $I(u,v)$, a relationship of Equation (1) described above is satisfied.

Therefore, a light amount $L'(u,v)$ calculated on the basis of Equation (4) indicates a light amount of the subject at the position (u,v).

$$L'(u,v)=I(u,v))/(S*F*G) \quad (4)$$

In this way, the recognition control unit 40 detects a light amount in the imaging area. Thereafter, similarly to the first embodiment, noise estimation is performed on the basis of a light amount detection result, and noise information indicating an estimation result is used as the selection determination information. Moreover, the recognition processing unit 50 performs an area sectioning process on the basis of the selection determination information, and selects a recognizer for each area to perform subject recognition.

As described above, according to the second embodiment, even when an information amount is degraded by the gradation conversion, the subject recognition can be performed without being affected by the degradation of the information amount. Furthermore, in the second embodiment, similarly to the first embodiment, a subject included in a captured image can be easily and accurately recognized.

4. Third Embodiment

Next, a third embodiment will be described. In the third embodiment, a light amount is detected with use of, as light amount related information, a control signal at a stage prior to analog gain adjustment and an image signal before the analog gain adjustment is performed.

Figure 9:
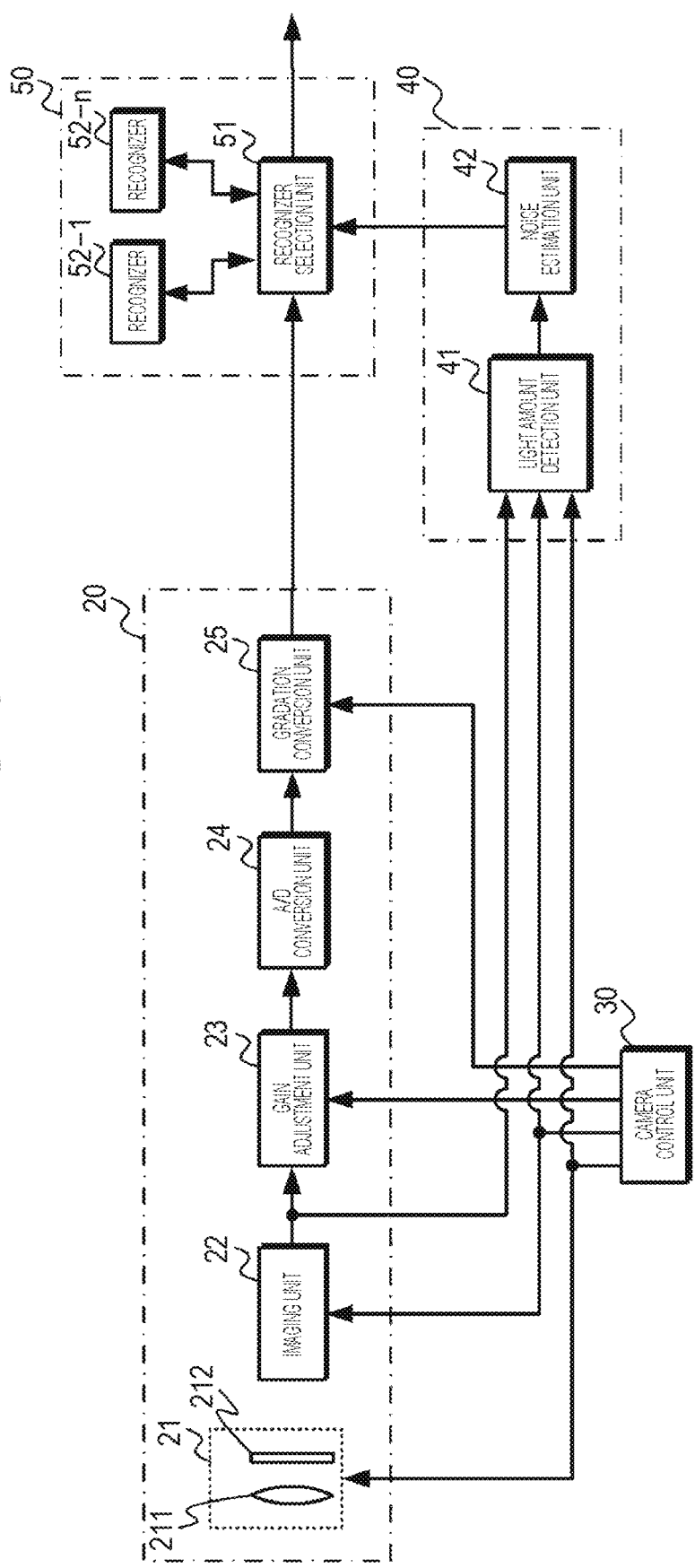
FIG. 9 is a diagram illustrating a configuration of a third embodiment.

FIG. 9 illustrates a configuration of the third embodiment of a recognition device. A camera unit 20 includes an optical system block 21, an imaging unit 22, a gain adjustment unit 23, an analog/digital (A/D) conversion unit 24, and a gradation conversion unit 25.

The optical system block 21 has an optical lens 211 and an aperture mechanism 212. The optical system block 21 performs a focus operation and a zoom operation, by moving the optical lens 211 on the basis of a control signal supplied from a camera control unit 30. Furthermore, the optical system block 21 drives the aperture mechanism 212 on the basis of a control signal, to adjust a light amount of a subject optical image.

The imaging unit 22 generates an image signal corresponding to the subject optical image, and outputs to the gain adjustment unit 23 and a recognition control unit 40. Furthermore, the imaging unit 22 controls an exposure period of an imaging element on the basis of a control signal supplied from the camera control unit 30, and performs imaging at a desired shutter speed. Note that the exposure period in the imaging operation may able to be changed by driving a shutter mechanism provided in the optical system block 21.

The gain adjustment unit 23 performs analog gain adjustment of the image signal generated by the imaging unit 22, and outputs to the A/D conversion unit 24. The A/D conversion unit 24 converts the image signal after the analog gain adjustment from an analog signal to a digital signal, and outputs to the gradation conversion unit 25.

The gradation conversion unit 25 compresses luminance gradation of the image signal supplied from the A/D conversion unit 24, by using a conversion function based on the control signal. The gradation conversion unit 25 outputs the image signal after the gradation conversion to a recognition processing unit 50.

The camera control unit 30 generates and supplies a control signal to the camera unit 20, to control an operation of each unit in the camera unit 20. Furthermore, the camera control unit 30 outputs a control signal to the recognition control unit 40.

The recognition control unit 40 has a light amount detection unit 41 and a noise estimation unit 42. The light amount detection unit 41 detects a light amount in the imaging area on the basis of the image signal before the analog gain adjustment supplied from the camera unit 20 and the control signal that is related to a process in a stage prior to the analog gain adjustment and is supplied from the camera control unit 30.

The noise estimation unit 42 estimates noise on the basis of a light amount detection result of the light amount detection unit 41, and generates noise information indicating an estimation result. The noise estimation unit 42 outputs the generated noise information to the recognition processing unit 50 as selection determination information.

The recognition processing unit 50 includes a recognizer selection unit 51 and a plurality of recognizers 52-1 to 52-n. For example, the recognition processing unit 50 has a recognizer capable of recognizing a subject with high accuracy from a captured image with little noise, and a recognizer capable of recognizing a subject with high accuracy from a captured image with much noise. The recognizer selection unit 51 performs an area sectioning process of an imaging area on the basis of the selection determination information from the recognition control unit 40, selects a recognizer for each sectioned area, and uses the selected recognizer 52-1 (52-n) to perform subject recognition on the basis of the image signal supplied from the camera unit 20.

In an operation of the third embodiment of the recognition device, similar processing to the operation of the first embodiment shown in FIG. 3 is performed, and processing contents of steps ST2 and ST3 are different from those of the first embodiment.

In step ST2, the recognition device acquires light amount related information. Here, as the light amount related information, for example, aperture value information F and shutter speed information S are used as the light amount related information. Furthermore, as the light amount related information, an image signal before the analog gain adjustment in which a signal level changes in accordance with the light amount of the imaging area is used. The recognition control unit 40 of the recognition device 10 acquires the light amount related information in this way, and the process proceeds to step ST3.

In step ST3, the recognition device detects a light amount. The recognition control unit 40 detects a light amount in the imaging area on the basis of the light amount related information outputted in step ST2.

Here, a light amount detection process will be described. Assuming that a subject at a position (u,v) in a captured image is a light amount L(u,v), and an image signal before the analog gain adjustment at the position (u,v) is a signal value A(u,v), a relationship of Equation (5) is satisfied.

$$A(u,v)=L(u,v)*S*F \quad (5)$$

Therefore, a light amount L'(u,v) calculated on the basis of Equation (6) indicates a light amount of the subject at the position (u,v).

$$L'(u,v)=A(u,v))/(S*F) \quad (6)$$

In this way, the recognition control unit 40 detects a light amount in the imaging area. Thereafter, similarly to the first embodiment, noise estimation is performed on the basis of a light amount detection result, and noise information indicating an estimation result is used as the selection determination information. Moreover, the recognition processing unit 50 performs an area sectioning process on the basis of the selection determination information, and selects a recognizer for each area to perform subject recognition.

In this way, according to the third embodiment, even when an information amount is degraded by the gradation conversion or the analog gain adjustment, it becomes possible to perform subject recognition without being affected by the degradation of the information amount. Furthermore, in the third embodiment, similarly to the first embodiment, a subject included in a captured image can be easily and accurately recognized.

5. Fourth Embodiment

In the first to third embodiments described above, the case has been exemplified in which a light amount is detected with use of a control signal generated by the camera control unit 30, but the control signal may not be acquired depending on the configuration of the recognition device. For example, in a case where the camera unit 20 and the camera control unit 30 are provided separately from the recognition device, and a control signal cannot be communicated between the camera control unit 30 and the recognition control unit 40, the control signal cannot be used as the light amount related information. Therefore, in the fourth embodiment, a case will be described in which a light amount in an imaging area is detected without using a control signal.

Figure 10:
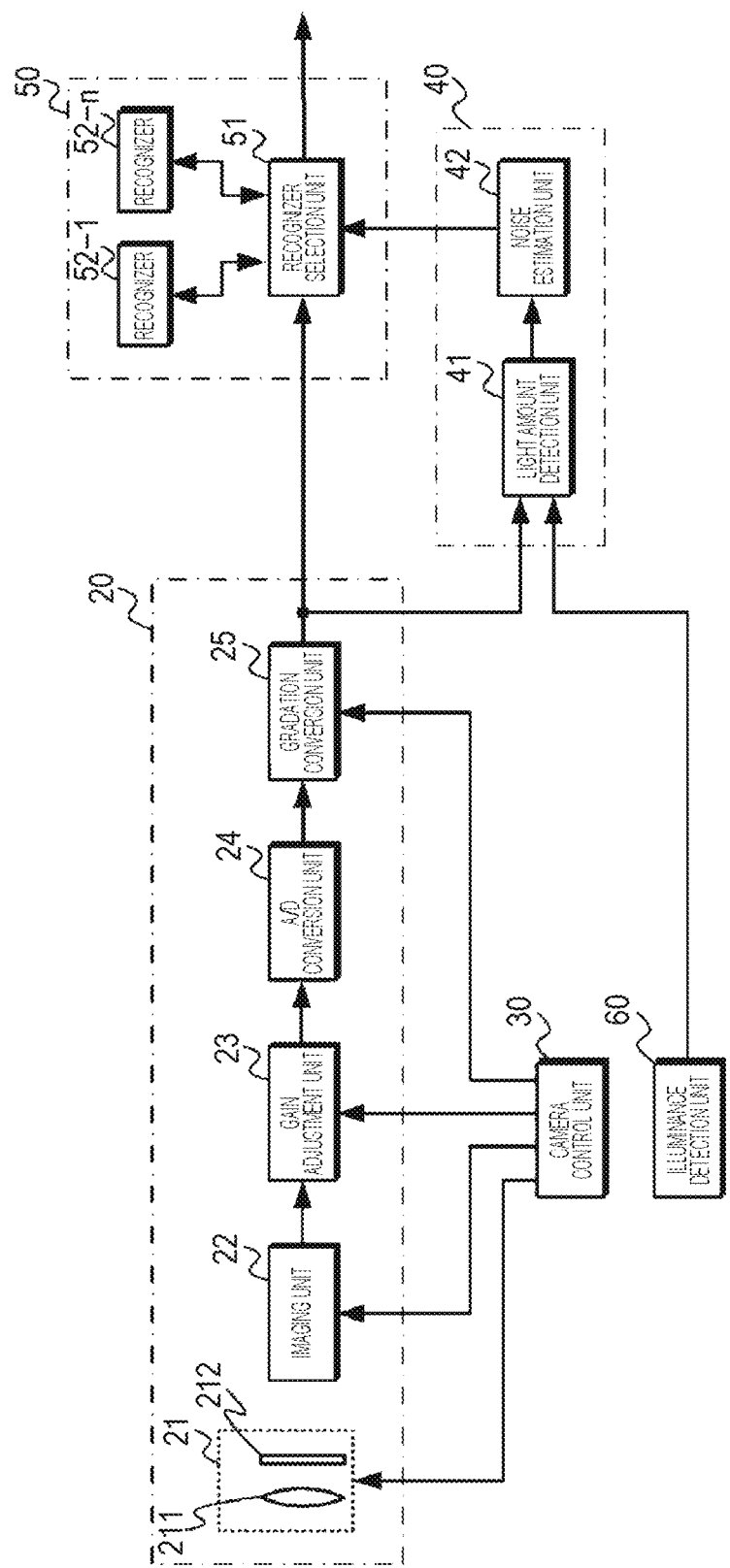
FIG. 10 is a diagram illustrating a configuration of a fourth embodiment.

FIG. 10 illustrates a configuration of the fourth embodiment of a recognition device. A camera unit 20 includes an optical system block 21, an imaging unit 22, a gain adjustment unit 23, an analog/digital (A/D) conversion unit 24, and a gradation conversion unit 25.

The optical system block 21 has an optical lens 211 and an aperture mechanism 212. The optical system block 21 performs a focus operation and a zoom operation, by moving the optical lens 211 on the basis of a control signal supplied from a camera control unit 30. Furthermore, the optical system block 21 drives the aperture mechanism 212 on the basis of a control signal, to adjust a light amount of a subject optical image.

The imaging unit 22 generates an image signal corresponding to the subject optical image, and outputs to the gain adjustment unit 23. Furthermore, the imaging unit 22 controls an exposure period of an imaging element on the basis of a control signal supplied from the camera control unit 30, and performs imaging at a desired shutter speed. Note that the exposure period in the imaging operation may able to be changed by driving a shutter mechanism provided in the optical system block 21.

The gain adjustment unit 23 performs analog gain adjustment of the image signal generated by the imaging unit 22, and outputs to the A/D conversion unit 24. The A/D conversion unit 24 converts the image signal after the analog gain adjustment from an analog signal to a digital signal, and outputs to the gradation conversion unit 25.

The gradation conversion unit 25 compresses luminance gradation of the image signal supplied from the A/D conversion unit 24, by using a conversion function based on the control signal. The gradation conversion unit 25 outputs the image signal after the gradation conversion to a recognition control unit 40 and a recognition processing unit 50.

The camera control unit 30 generates and supplies a control signal to the camera unit 20, to control an operation of each unit in the camera unit 20.

An illuminance detection unit 60 generates imaging environment illuminance information indicating brightness of the imaging area, and outputs to the recognition control unit 40.

The recognition control unit 40 has a light amount detection unit 41 and a noise estimation unit 42. The light amount detection unit 41 detects a light amount of the imaging area, on the basis of the image signal after the gradation conversion supplied from the camera unit 20 and the imaging environment illuminance information supplied from the illuminance detection unit 60.

The noise estimation unit 42 estimates noise on the basis of a light amount detection result of the light amount detection unit 41, and generates noise information indicating an estimation result. The noise estimation unit 42 outputs the generated noise information to the recognition processing unit 50 as selection determination information.

The recognition processing unit 50 includes a recognizer selection unit 51 and a plurality of recognizers 52-1 to 52-*n*. For example, the recognition processing unit 50 has a recognizer capable of recognizing a subject with high accuracy from a captured image with little noise, and a recognizer capable of recognizing a subject with high accuracy from a captured image with much noise. The recognizer selection unit 51 performs an area sectioning process of an imaging area on the basis of the selection determination information from the recognition control unit 40, selects a recognizer for each sectioned area, and uses the selected recognizer 52-1 (52-*n*) to perform subject recognition on the basis of the image signal supplied from the camera unit 20.

In an operation of the fourth embodiment of the recognition device, similar processing to the operation of the first embodiment shown in FIG. 3 is performed, and processing contents of step ST2 and step ST3 are different from those of the first embodiment.

In step ST2, the recognition device acquires light amount related information. Here, as the light amount related information, for example, imaging environment illuminance $\beta$ is used as the light amount related information. Furthermore, an image signal after the gradation conversion in which a signal level changes in accordance with the light amount of the imaging area is used as the light amount related information. The recognition control unit 40 of the recognition device 10 acquires the light amount related information in this way, and the process proceeds to step ST3.

In step ST3, the recognition device detects a light amount. The recognition control unit 40 detects a light amount in the imaging area on the basis of the light amount related information outputted in step ST2.

Here, a light amount detection process will be described. Assuming that an image signal after the gradation conversion of a position (u,v) in a captured image is a signal value $J(u,v)$, when the imaging environment illuminance is approximated to image average illuminance, a light amount $L'(u,v)$ calculated on the basis of Equation (7) indicates a light amount of the subject at the position (u,v).

$$L'(u,v)=J(u,v))*\beta \qquad (7)$$

In this way, the recognition control unit 40 detects a light amount in the imaging area. Thereafter, similarly to the first embodiment, noise estimation is performed on the basis of a light amount detection result, and noise information indicating an estimation result is used as the selection determination information. Moreover, the recognition processing unit 50 performs an area sectioning process on the basis of the selection determination information, and selects a recognizer for each area to perform subject recognition.

In this way, according to the fourth embodiment, even in a case where the control signal cannot be acquired from the camera control unit 30, it is possible to detect the light amount of the imaging area on the basis of the imaging environment illuminance detected by the illuminance detection unit 60 and the image signal outputted from the camera unit 20. Moreover, similarly to the first embodiment and the like described above, the recognizer can be selected on the basis of the selection determination information generated on the basis of the detected light amount, and a subject recognition process can be performed on the captured image of the imaging area. Furthermore, in the fourth embodiment, similarly to the first embodiment, a subject included in a captured image can be easily and accurately recognized.

6. Application Example

The technology according to the present disclosure can be applied to various products. For example, the technology according to the present disclosure may be realized as a device equipped on any type of mobile object, such as an automobile, an electric car, a hybrid electric car, a motorcycle, a bicycle, personal mobility, an airplane, a drone, a ship, a robot, construction machinery, or agricultural machinery (a tractor).

Figure 11:
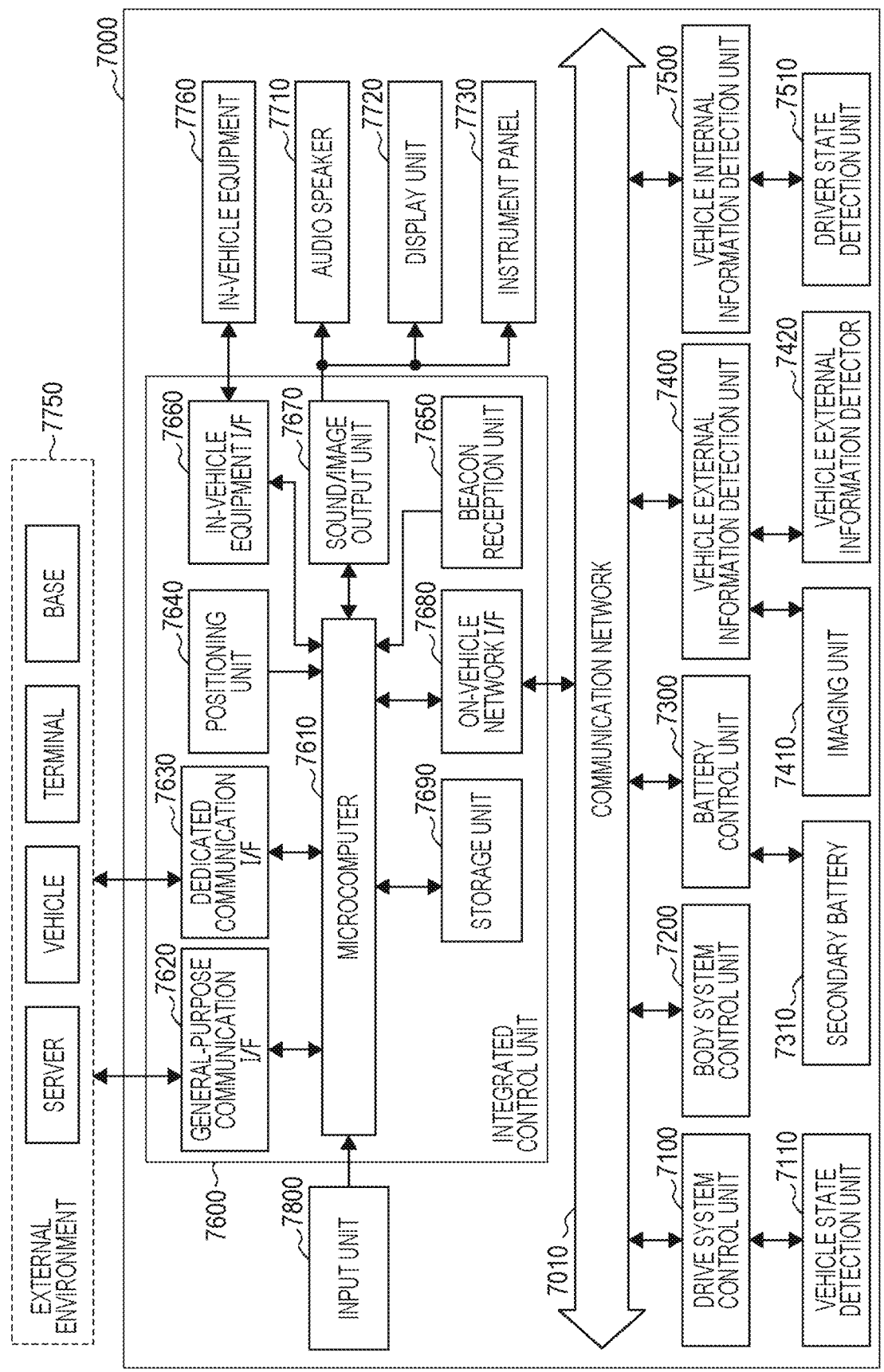
FIG. 11 is a block diagram showing an example of a schematic configuration of a vehicle control system.

FIG. 11 is a block diagram illustrating a schematic configuration example of a vehicle control system 7000, which is an example of a mobile object control system to which the technology according to the present disclosure may be applied. The vehicle control system 7000 includes a plurality of electronic control units connected via a communication network 7010. In the example shown in FIG. 11, the vehicle control system 7000 includes a drive system control unit 7100, a body system control unit 7200, a battery control unit 7300, a vehicle external information detection unit 7400, a vehicle internal information detection unit 7500, and an integrated control unit 7600. The communication network 7010 connecting these plurality of control units may be, for example, an in-vehicle communication network conforming to any standard such as a controller area network (CAN), a local interconnect network (LIN), a local area network (LAN), or FlexRay (registered trademark).

Each control unit includes: a microcomputer configured to perform arithmetic processing in accordance with various programs; a storage unit that stores programs to be executed by the microcomputer, parameters to be used for various operations, and the like; and a drive circuit configured to drive various devices to be controlled. Each control unit includes a network I/F for communication with other control units via the communication network 7010, and a communication I/F for communication with devices inside and outside the vehicle, sensors, or the like, through wired or wireless communication. FIG. 11 illustrates, as a functional configuration of the integrated control unit 7600, a microcomputer 7610, a general-purpose communication I/F 7620, a dedicated communication I/F 7630, a positioning unit 7640, a beacon reception unit 7650, an in-vehicle equipment I/F 7660, a sound/image output unit 7670, an on-vehicle network I/F 7680, and a storage unit 7690. Other control units similarly include a microcomputer, a communication I/F, a storage unit, and the like.

The drive system control unit 7100 controls an operation of devices related to a drive system of a vehicle in accordance with various programs. For example, the drive system control unit 7100 functions as: a driving force generation device for generation of a driving force of the vehicle such as an internal combustion engine or a drive motor; a driving force transmission mechanism for transmission of a driving force to wheels; a steering mechanism to adjust a steering angle of the vehicle; and a control device such as a braking device that generates a braking force of the vehicle. The drive system control unit 7100 may have a function as a control device such as an antilock brake system (ABS) or an electronic stability control (ESC).

The drive system control unit 7100 is connected with a vehicle state detection unit 7110. The vehicle state detection unit 7110 includes at least one of, for example, a gyro sensor that detects an angular velocity of axial rotation motion of a vehicle body, an acceleration sensor that detects acceleration of the vehicle, or a sensor for detection of an accelerator pedal operation amount, a brake pedal operation amount, a steering wheel steering angle, an engine speed, a wheel rotation speed, or the like. The drive system control unit 7100 performs arithmetic processing by using a signal inputted from the vehicle state detection unit 7110, and controls an internal combustion engine, a drive motor, an electric power steering device, a brake device, and the like.

The body system control unit 7200 controls an operation of various devices mounted on the vehicle body in accordance with various programs. For example, the body system control unit 7200 functions as a control device for a keyless entry system, a smart key system, a power window device, or various lamps such as a headlamp, a back lamp, a brake lamp, a turn indicator, or a fog lamp. In this case, the body system control unit 7200 may be inputted with radio waves or signals of various switches transmitted from a portable device that substitutes for a key. The body system control unit 7200 receives an input of these radio waves or signals, and controls a door lock device, a power window device, a lamp, and the like of the vehicle.

The battery control unit 7300 controls a secondary battery 7310 that is a power supply source of the drive motor, in accordance with various programs. For example, the battery control unit 7300 is inputted with information such as a battery temperature, a battery output voltage, or remaining capacity of a battery, from a battery device including the secondary battery 7310. The battery control unit 7300 performs arithmetic processing by using these signals, and performs temperature control of the secondary battery 7310 or control of a cooling device or the like provided in the battery device.

The vehicle external information detection unit 7400 detects information about the outside of the vehicle equipped with the vehicle control system 7000. For example, the vehicle external information detection unit 7400 is connected with at least one of an imaging unit 7410 or a vehicle external information detector 7420. The imaging unit 7410 includes at least one of a time of flight (ToF) camera, a stereo camera, a monocular camera, an infrared camera, or another camera. The vehicle external information detector 7420 includes at least one of, for example, an environmental sensor for detection of current weather or meteorological phenomena, or a surrounding information detection sensor for detection of other vehicles, obstacles, pedestrians, and the like around the vehicle equipped with the vehicle control system 7000.

The environment sensor may be at least one of, for example, a raindrop sensor that detects rainy weather, a fog sensor that detects fog, a sunshine sensor that detects a degree of sunshine, or a snow sensor that detects snowfall. The surrounding information detection sensor may be at least one of an ultrasonic sensor, a radar device, or a light detection and ranging or laser imaging detection and ranging (LIDAR) device. The imaging unit 7410 and the vehicle external information detector 7420 may be individually provided as independent sensors or devices, or may be provided as a device in which a plurality of sensors or devices is integrated.

Figure 12:
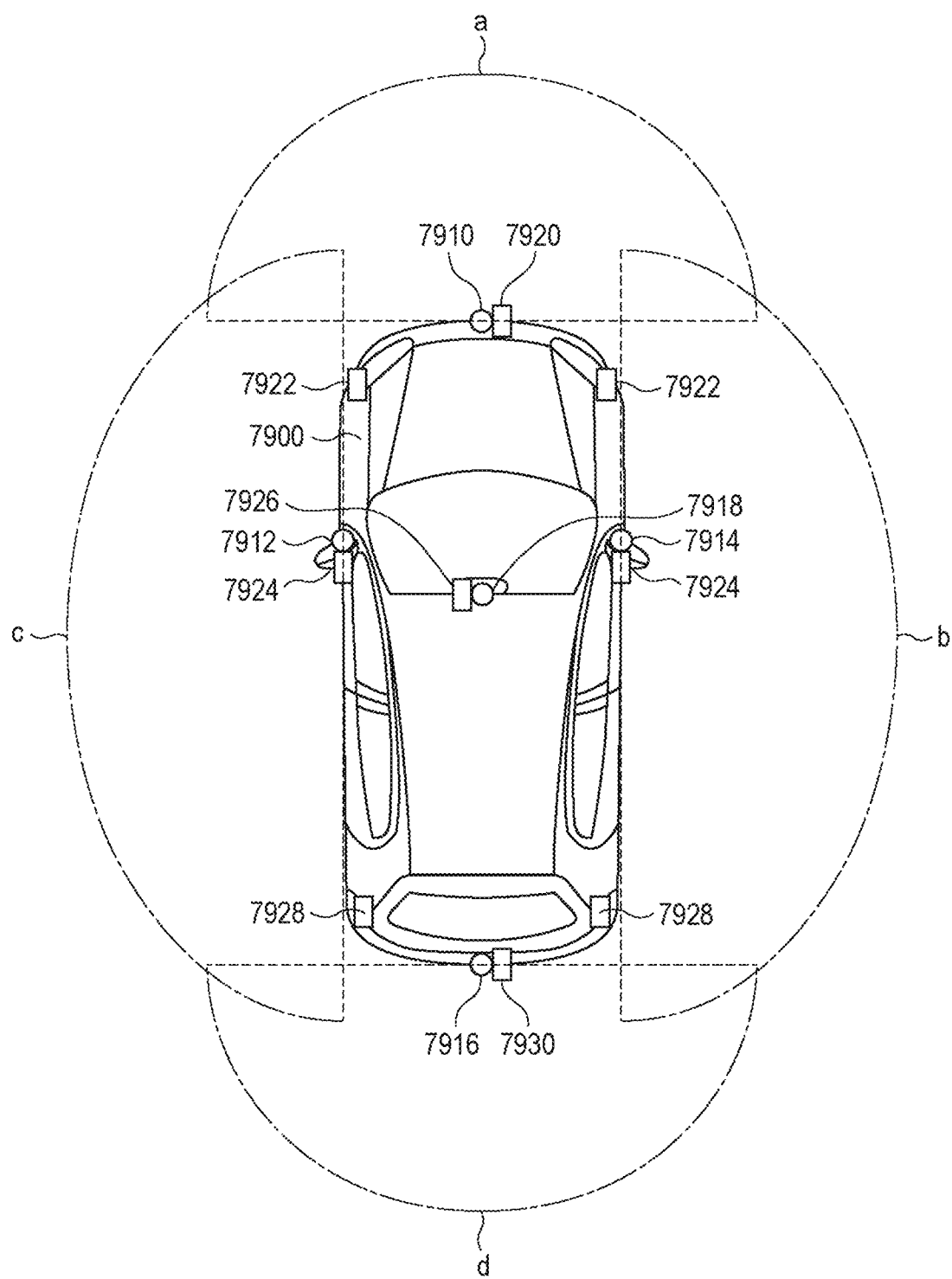
FIG. 12 is an explanatory view showing an example of installation positions of a vehicle external information detector and an imaging unit.

Here, FIG. 12 shows an example of installation positions of the imaging unit 7410 and the vehicle external information detector 7420. Imaging units 7910, 7912, 7914, 7916, and 7918 are provided at, for example, at least one position of a front nose, side mirrors, a rear bumper, a back door, or an upper part of a windshield in a vehicle cabin of a vehicle 7900. The imaging unit 7910 provided at the front nose and the imaging unit 7918 provided at the upper part of the windshield in the vehicle cabin mainly acquire an image in front of the vehicle 7900. The imaging units 7912 and 7914 provided at the side mirrors mainly acquire an image of a side of the vehicle 7900. The imaging unit 7916 provided at the rear bumper or the back door mainly acquires an image behind the vehicle 7900. The imaging unit 7918 provided at the upper part of the windshield in the vehicle cabin is mainly used for detection of a preceding vehicle, or a pedestrian, an obstacle, a traffic light, a traffic sign, a lane, or the like.

Note that FIG. 12 shows an example of an imaging range of each of the imaging units 7910, 7912, 7914, and 7916. An imaging range a indicates an imaging range of the imaging unit 7910 provided at the front nose, imaging ranges b and c indicate imaging ranges of the imaging units 7912 and 7914 each provided at the side mirrors, and an imaging range d indicates an imaging range of the imaging unit 7916 provided at the rear bumper or the back door. For example, by superimposing image data captured by the imaging units 7910, 7912, 7914, and 7916, an overhead view image of the vehicle 7900 viewed from above can be obtained.

Vehicle external information detectors 7920, 7922, 7924, 7926, 7928, and 7930 provided at a front, a rear, a side, a corner, and an upper part of the windshield in the vehicle cabin of the vehicle 7900 may be, for example, an ultrasonic sensor or a radar device. The vehicle external information detectors 7920, 7926, and 7930 provided at the front nose, the rear bumper, the back door, and the upper part of the windshield in the vehicle cabin of the vehicle 7900 may be, for example, a LIDAR device. These vehicle external information detectors 7920 to 7930 are mainly used for detection of a preceding vehicle, a pedestrian, an obstacle, or the like.

Returning to FIG. 11, the description will be continued. The vehicle external information detection unit 7400 causes the imaging unit 7410 to capture an image of an outside of the vehicle, and receives the captured image data. Furthermore, the vehicle external information detection unit 7400 receives detection information from the connected vehicle external information detector 7420. In a case where the vehicle external information detector 7420 is an ultrasonic sensor, a radar device, or a LIDAR device, the vehicle external information detection unit 7400 causes emission of ultrasonic waves, electromagnetic waves, or the like and receives information of received reflected waves. The vehicle external information detection unit 7400 may perform an object detection process or a distance detection process for a person, a vehicle, an obstacle, a sign, a character on a road surface, or the like on the basis of the received information. The vehicle external information detection unit 7400 may perform an environment recognition process for recognizing rainfall, fog, road surface conditions, and the like on the basis of the received information. The vehicle external information detection unit 7400 may calculate a distance to an object outside the vehicle on the basis of the received information.

Furthermore, the vehicle external information detection unit 7400 may perform an image recognition process or a distance detection process for recognizing a person, a vehicle, an obstacle, a sign, a character on a road surface, or the like on the basis of the received image data. The vehicle external information detection unit 7400 may perform processing such as distortion correction or position adjustment on the received image data, and may combine image data captured by different imaging units 7410 to generate an overhead view image or a panoramic image. The vehicle external information detection unit 7400 may use image data captured by different imaging units 7410 to perform a viewpoint conversion process.

The vehicle internal information detection unit 7500 detects information inside the vehicle. The vehicle internal information detection unit 7500 is connected with, for example, a driver state detection unit 7510 that detects a state of a driver. The driver state detection unit 7510 may include a camera that captures an image of the driver, a biological sensor that detects biological information of the driver, a microphone that collects sound in the vehicle cabin, and the like. The biological sensor is provided on, for example, a seat surface, a steering wheel, and the like, and detects biological information of a passenger sitting on the seat or a driver gripping the steering wheel. On the basis of detection information inputted from the driver state detection unit 7510, the vehicle internal information detection unit 7500 may calculate a degree of tiredness or a degree of concentration of the driver, or may determine whether or not the driver is asleep. The vehicle internal information detection unit 7500 may perform processing such as a noise canceling process on a collected audio signal.

The integrated control unit 7600 controls an overall operation in the vehicle control system 7000 in accordance with various programs. The integrated control unit 7600 is connected with an input unit 7800. The input unit 7800 is realized by, for example, a device that may be operated by a passenger, such as a touch panel, a button, a microphone, a switch, or a lever. The integrated control unit 7600 may be inputted with data obtained by sound recognition of sound inputted through the microphone. The input unit 7800 may be, for example, a remote control device using infrared rays or other radio waves, or may be external connection equipment such as a mobile phone or a personal digital assistant (PDA) compatible with an operation of the vehicle control system 7000. The input unit 7800 may be, for example, a camera, in which case a passenger can input information by gesture. Alternatively, data obtained by detecting a movement of a wearable device worn by the passenger may be inputted. Moreover, the input unit 7800 may include, for example, an input control circuit or the like configured to use the input unit 7800 described above to generate an input signal on the basis of information inputted by the passenger or the like, and output to the integrated control unit 7600. By operating the input unit 7800, the passenger or the like inputs various data to the vehicle control system 7000 and instructs a processing operation.

The storage unit 7690 may include a read only memory (ROM) that stores various programs to be executed by the microcomputer, and a random access memory (RAM) that stores various parameters, operation results, sensor values, and the like. Furthermore, the storage unit 7690 may be realized by a magnetic storage device such as a hard disk drive (HDD), a semiconductor storage device, an optical storage device, a magneto-optical storage device, or the like.

The general-purpose communication I/F 7620 is a general-purpose communication I/F that mediates communication with various kinds of equipment existing in an external environment 7750. The general-purpose communication I/F 7620 may implement a cellular communication protocol such as global system for mobile communications (GSM (registered trademark)), WiMAX (registered trademark), long term evolution (LTE (registered trademark)), or LTE-advanced (LTE-A), or another wireless communication protocol such as wireless LAN (also referred to as Wi-Fi (registered trademark)) or Bluetooth (registered trademark). For example, via a base station or an access point, the general-purpose communication I/F 7620 may connect to equipment (for example, an application server or a control server) existing on an external network (for example, the Internet, a cloud network, or a network unique to a business operator). Furthermore, for example, the general-purpose communication I/F 7620 may use a peer to peer (P2P) technology to connect to a terminal (for example, a terminal of a driver, a pedestrian, or a store, or a machine type communication (MTC) terminal) existing near the vehicle.

The dedicated communication I/F 7630 is a communication I/F that supports a communication protocol established for the purpose of use in a vehicle. The dedicated communication I/F 7630 may implement a standard protocol such as, for example, a wireless access in vehicle environment (WAVE), which is a combination of lower layer IEEE 802.11p and upper layer IEEE 1609, dedicated short range communications (DSRC), or a cellular communication protocol. The dedicated communication I/F 7630 typically performs V2X communication, which is a concept that includes one or more of vehicle-to-vehicle communication, vehicle to infrastructure communication, vehicle to home communication, and vehicle to pedestrian communication.

The positioning unit 7640 receives, for example, a global navigation satellite system (GNSS) signal from a GNSS satellite (for example, a global positioning system (GPS) signal from a GPS satellite) to perform positioning, and generates position information including latitude, longitude, and altitude of the vehicle. Note that the positioning unit 7640 may specify a current location by exchanging signals with a wireless access point, or may acquire position information from a terminal having a positioning function, such as a mobile phone, a PHS, or a smartphone.

The beacon reception unit 7650 receives, for example, radio waves or electromagnetic waves transmitted from a wireless station or the like installed on a road, and acquires information such as a current location, traffic congestion, traffic close, a required time, and the like. Note that the function of the beacon reception unit 7650 may be included in the dedicated communication I/F 7630 described above.

The in-vehicle equipment I/F 7660 is a communication interface that mediates a connection between the microcomputer 7610 and various kinds of in-vehicle equipment 7760 existing inside the vehicle. The in-vehicle equipment I/F 7660 may establish a wireless connection by using a wireless communication protocol such as a wireless LAN, Bluetooth (registered trademark), near field communication (NFC), or a wireless USB (WUSB). Furthermore, the in-vehicle equipment I/F 7660 may establish a wired connection with a universal serial bus (USB), a high-definition multimedia interface (HDMI, registered trademark), a mobile high-definition link (MHL), or the like, via a connection terminal (not illustrated) (and a cable if necessary). The in-vehicle equipment 7760 may include, for example, at least one of mobile equipment or wearable equipment owned by a passenger, or information equipment carried in or attached to the vehicle. Furthermore, the in-vehicle equipment 7760 may include a navigation device that searches for a route to any given destination. The in-vehicle equipment I/F 7660 exchanges control signals or data signals with these pieces of the in-vehicle equipment 7760.

The on-vehicle network I/F 7680 is an interface that mediates communication between the microcomputer 7610 and the communication network 7010. The on-vehicle network I/F 7680 transmits and receives signals and the like in accordance with a predetermined protocol supported by the communication network 7010.

The microcomputer 7610 of the integrated control unit 7600 controls the vehicle control system 7000 in accordance with various programs, on the basis of information acquired via at least one of the general-purpose communication I/F 7620, the dedicated communication I/F 7630, the positioning unit 7640, the beacon reception unit 7650, the in-vehicle equipment I/F 7660, or the on-vehicle network I/F 7680. For example, on the basis of the acquired information about the inside and outside of the vehicle, the microcomputer 7610 may operate a control target value of the driving force generation device, the steering mechanism, or the braking device, and output a control command to the drive system control unit 7100. For example, the microcomputer 7610 may perform cooperative control for the purpose of realizing functions of advanced driving assistant system (ADAS) including avoidance of collisions or mitigation of impacts of the vehicle, follow-up traveling on the basis of a distance between vehicles, vehicle speed maintenance traveling, vehicle collision warning, vehicle lane departure warning, and the like. Furthermore, by controlling the driving force generation device, the steering mechanism, the braking device, or the like on the basis of the acquired information about surroundings of the vehicle, the microcomputer 7610 may perform cooperative control for the purpose of, for example, automatic driving for autonomously traveling without depending on an operation of the driver.

On the basis of information acquired via at least one of the general-purpose communication I/F 7620, the dedicated communication I/F 7630, the positioning unit 7640, the beacon reception unit 7650, the in-vehicle equipment I/F 7660, or the on-vehicle network I/F 7680, the microcomputer 7610 may generate 3D distance information between the vehicle and surrounding objects such as structures and people, and create local map information including peripheral information of the current location of the vehicle. Furthermore, on the basis of the acquired information, the microcomputer 7610 may predict a danger such as a vehicle collision, proximity of a pedestrian or the like, or entry into a closed road, to generate a warning signal. The warning signal may be, for example, a signal for generating a warning sound or lighting a warning lamp.

The sound/image output unit 7670 transmits an output signal of at least one of sound or an image, to an output device capable of visually or audibly notifying, of information, a passenger of the vehicle or outside the vehicle. In the example of FIG. 11, an audio speaker 7710, a display unit 7720, and an instrument panel 7730 are illustrated as the output devices. The display unit 7720 may include, for example, at least one of an on-board display or a head-up display. The display unit 7720 may have an augmented reality (AR) display function. The output device may be other devices such as a headphone, a wearable device such as a spectacle-shaped display worn by a passenger, a projector, a lamp, or the like other than these devices. In a case where the output device is a display device, the display device visually displays results obtained by various processes performed by the microcomputer 7610 or information received from other control units, in various formats such as texts, images, tables, and graphs. Furthermore, in a case where the output device is a sound output device, the sound output device converts an audio signal formed by reproduced sound data, acoustic data, or the like into an analog signal, and outputs audibly.

Note that, in the example shown in FIG. 11, at least two control units connected via the communication network 7010 may be integrated as one control unit. Alternatively, each control unit may be configured by a plurality of control units. Moreover, the vehicle control system 7000 may include another control unit that is not shown. Furthermore, in the description described above, some or all of the functions performed by any of the control units may be provided to another control unit. That is, as long as information is transmitted and received via the communication network 7010, predetermined arithmetic processing may be performed by any of the control units. Similarly, a sensor or a device connected to any of the control units may be connected to another control unit, and a plurality of control units may mutually transmit and receive detection information via the communication network 7010.

In the vehicle control system 7000 described above, the present technology can be applied to the vehicle external information detection unit 7400 shown in FIG. 11. In this way, when the present technology is applied to the vehicle external information detection unit 7400, for example, it becomes possible to easily recognize a subject outside the vehicle and reduce fatigue and the like of the driver by reducing an influence of brightness of the subject. Furthermore, it becomes possible to acquire information required for automatic driving and the like with high accuracy.

Furthermore, when the technology according to the present disclosure is applied to a monitoring system, it becomes possible to accurately perform a recognition process regardless of brightness of a subject, and a person in a bright place or a person in a dark place can be accurately monitored, for example.

The series of processing described in the specification can be executed by hardware, software, or a combined configuration of both. In a case of executing processing by software, a program recorded with a processing sequence is installed and executed in a memory incorporated in dedicated hardware in a computer.

Alternatively, the program can be installed and executed on a general-purpose computer that can execute various processes.

For example, the program can be recorded in advance on a hard disk, a solid state drive (SSD), or a read only memory (ROM) as a recording medium. Alternatively, the program can be stored (recorded) temporarily or permanently, in a removable recording medium such as a flexible disk, a compact disk read only memory (CD-ROM), a magneto optical (MO) disk, a digital versatile disk (DVD), a Blu-Ray (registered trademark) disk (BD), a magnetic disk, or a semiconductor memory card. Such a removable recording medium can be provided as so-called package software.

Furthermore, in addition to being installed on a computer from a removable recording medium, the program may be transferred to the computer in a wired or wireless manner from a download site via a network such as a local area network (LAN) or the Internet. In the computer, the program transferred in such a manner can be received and installed on a recording medium such as an incorporated hard disk.

Note that the effects described in this specification are merely examples and are not limited, and additional effects that are not described may be present. Furthermore, the present technology should not be construed as being limited to the embodiments of the technology described above. The embodiments of the present technology disclose the present technology in the form of exemplification, and it is obvious that those skilled in the art can modify or substitute the embodiments within the gist of the present technology. In other words, in order to determine the gist of the present technology, claims should be taken into consideration.

Furthermore, the recognition device of the present technology may also have the following configurations.

(1) A recognition device including:
  a recognition control unit configured to generate selection determination information on the basis of a light amount detection result of an imaging area; and
  a recognition processing unit configured to perform a subject recognition process on a captured image showing the imaging area, by using a recognizer selected on the basis of the selection determination information generated by the recognition control unit.

(2) The recognition device according to (1), in which the recognition control unit performs noise estimation on the basis of the light amount detection result, and uses a noise estimation result as the selection determination information.

(3) The recognition device according to (2), in which the recognition processing unit selects a first recognizer in a case where it is determined that noise is equal to or less than a threshold value on the basis of the selection determination information, and selects a second recognizer that is more resistant to noise than the first recognizer, in a case where it is determined that noise is larger than a threshold value on the basis of the selection determination information.

(4) The recognition device according to any one of (1) to (3), in which the recognition processing unit performs area division of the captured image on the basis of the selection determination information, and selects the recognizer for each divided area.

(5) The recognition device according to any one of (1) to (3), in which the recognition control unit performs area division of the captured image in accordance with a gradation conversion switching operation of an imaging unit that acquires the captured image, and generates the selection determination information for each divided area.

(6) The recognition device according to any one of (1) to (5), in which the recognition control unit detects a light amount of the imaging area on the basis of a control signal for control of an operation of an imaging unit that acquires the captured image and an image signal generated by the imaging unit.

(7) The recognition device according to (6), in which the control signal is a signal for control of at least any of an aperture, a shutter speed, analog gain adjustment, or gradation conversion.

(8) The recognition device according to (7), in which
  the control signal is a signal for control of the aperture, the shutter speed, the analog gain adjustment, and the gradation conversion, and
  the image signal is a signal subjected to the analog gain adjustment and the gradation conversion.

(9) The recognition device according to (7), in which
  the control signal is a signal for control of the aperture, the shutter speed, and the analog gain adjustment, and
  the image signal is a signal subjected to the analog gain adjustment.

(10) The recognition device according to (7), in which
  the control signal is a signal for control of the aperture and the shutter speed, and
  the image signal is a signal before the analog gain adjustment is performed.

(11) The recognition device according to (1), in which the recognition control unit detects the light amount on the basis of an image signal generated by the imaging unit and illuminance detected by an illuminance detection unit that detects imaging environment illuminance.

INDUSTRIAL APPLICABILITY

According to the recognition device, the recognition method, and the program of the present technology, selection determination information is generated on the basis of a light amount detection result of an imaging area, and a subject recognition process is performed on a captured image showing the imaging area with use of a recognizer selected on the basis of the selection determination information. For this reason, a subject included in the captured image can be easily and accurately recognized. Therefore, the present technology is suitable for a monitoring device that monitors a surrounding situation, a mobile object device that determines a surrounding situation and performs movement control, and the like.

REFERENCE SIGNS LIST

10 Recognition device
20 Camera unit
21 Optical system block
22 Imaging unit
23 Gain adjustment unit
24 A/D conversion unit
25 Gradation conversion unit
30 Camera control unit
40 Recognition control unit
41 Light amount detection unit
42 Noise estimation unit
50 Recognition processing unit
51 Recognizer selection unit
52-1 to 52-n Recognizer
60 Illuminance detection unit
211 Optical lens
212 Aperture mechanism

The invention claimed is:

1. A recognition device comprising:
  recognition control circuitry configured to generate selection determination information on a basis of a light amount detection result of an imaging area; and
  a recognition processing circuitry configured to perform a subject recognition process on a captured image showing the imaging area, by using a recognizer selected on a basis of the selection determination information, wherein one of
  the recognition processing circuitry is configured to perform area division of the captured image on a basis of the selection determination information and select the recognizer for each divided area, or
  the recognition control circuitry is configured to perform area division of the captured image in accordance with a gradation conversion switching operation of a camera that acquires the captured image, and generate the selection determination information for each divided area.

2. The recognition device according to claim 1, wherein the recognition control circuitry is configured to perform noise estimation on a basis of the light amount detection result, and use a noise estimation result as the selection determination information.

3. The recognition device according to claim 2, wherein the recognition processing circuitry is configured to
select a first recognizer on condition that the noise estimation result is equal to or less than a threshold value, and
select a second recognizer that is more resistant to noise than the first recognizer, on condition that the noise estimation result is larger than the threshold value.

4. The recognition device according to claim 1, wherein the recognition control circuitry is configured to detect the light amount of the imaging area on a basis of a control signal for control of an operation of the camera that acquires the captured image and an image signal generated by the camera.

5. The recognition device according to claim 4, wherein the control signal controls at least any of an aperture, a shutter speed, analog gain adjustment, or gradation conversion.

6. The recognition device according to claim 5, wherein the control signal controls the aperture, the shutter speed, the analog gain adjustment, and the gradation conversion, and
the image signal is subjected to the analog gain adjustment and the gradation conversion.

7. The recognition device according to claim 5, wherein the control signal is a signal for controls the aperture, the shutter speed, and the analog gain adjustment, and
the image signal is subjected to the analog gain adjustment.

8. The recognition device according to claim 5, wherein the control signal controls the aperture and the shutter speed, and
the image signal is not subjected to the analog gain adjustment.

9. The recognition device according to claim 1, wherein the recognition control circuitry is configured to detect the light amount on a basis of an image signal generated by the camera and illuminance detected by a sensor that detects imaging environment illuminance.

10. A recognition method comprising:
generating selection determination information on a basis of a light amount detection result of an imaging area;
performing a subject recognition process on a captured image showing the imaging area, by using a recognizer selected on a basis of the selection determination information; and one of
performing area division of the captured image on a basis of the selection determination information and selecting the recognizer for each divided area, or
performing area division of the captured image in accordance with a gradation conversion switching operation of a camera that acquires the captured image and generating the selection determination information for each divided area.

11. A non-transitory computer readable storage device having computer readable instructions that cause a computer to execute:
generating selection determination information on a basis of a light amount detection result of an imaging area;
performing a subject recognition process on a captured image showing the imaging area, by using a recognizer selected on a basis of the selection determination information; and one of
performing area division of the captured image on a basis of the selection determination information and selecting the recognizer for each divided area, or
performing area division of the captured image in accordance with a gradation conversion switching operation of a camera that acquires the captured image and generating the selection determination information for each divided area.

12. A non-transitory computer readable storage device according to claim 11, wherein the computer further executes performing noise estimation on a basis of the light amount detection result and using a noise estimation result as the selection determination information.

13. The recognition method according to claim 10, further comprising:
performing noise estimation on a basis of the light amount detection result, and
using a noise estimation result as the selection determination information.

* * * * *